Jan. 4, 1966 H. OBERBECK 3,227,949

METHOD AND APPARATUS TO MEASURE THE TRANSMISSION CHARACTERISTICS OF FOUR TERMINAL NETWORKS

Filed Jan. 11, 1960 2 Sheets-Sheet 1

Inventor
Helmut Oberbeck
by: John J. Dennemeyer and Edwin E. Greigg
Attorneys

Inventor
Helmut Oberbeck
By John J. Dennemeyer
and
Edwin E. Greigg
Attorneys

United States Patent Office 3,227,949

Patented Jan. 4, 1966

3,227,949

METHOD AND APPARATUS TO MEASURE THE TRANSMISSION CHARACTERISTICS OF FOUR TERMINAL NETWORKS

Helmut Oberbeck, Backnang, Wurttemberg, Germany, assignor to Telefunken G.m.b.H., Backnang, Wurttemberg, Germany, a corporation of Germany Filed Jan. 11, 1960, Ser. No. 1,623
Claims priority, application Germany, Jan. 15, 1959, T 16,128; July 30, 1959, T 17,025
7 Claims. (Cl. 324—57)

This invention relates to a method and electrical apparatus for measuring the transmission characteristics of four-terminal electric networks using non-linear circuit elements such as electron tubes (in their upper control range), rectifiers or limiters. The invention is more particularly related to the determination of the transmission or passing characteristics of four terminal networks acted upon by a frequency modulated carrier input signal.

The method according to the invention is not only suitable for measuring discrete values of amplitude and phase relationship of input and output, but it can also be used in employing the so-called wobble method as an additional feature in the inventive method. The wobble method usually comprises the steps of feeding an oscillating voltage to the input terminals of the network; the frequency of this voltage is slowly varied in frequency but its amplitude is kept as constant as possible; then the output of the network is detected. This output is a voltage having its amplitude varied with frequency, and it is fed to the vertical deflection electrodes of a cathode ray tube in an oscillograph. The horizontal deflection voltage is varied in proportion to the frequency variation of the input signal. The passing or transmission characteristics of this network becomes visible on the video screen of the oscillograph as a linear frequency plot.

This plotted characteristic is valid for frequency modulation systems only when the four terminal network has no non-linear circuit elements; i.e., no electron tubes, rectifiers and, most important, no limiters. In case the four terminal network does include such non-linear circuit elements, the frequency characteristic obtained by the foregoing wobble method is no longer valid for oscillations which include both amplitude and frequency modulation. This becomes immediately clear for the case of amplitude modulation on the realization that with such an indicating method the resulting plotted characteristic of a network having a divider looks like a plot of a characteristic having a naturally flat maximum portion. The latter would in fact permit passage of an amplitude modulated carrier if the side-bands were inside of the flat portion. The network, however, having a limiter changes the degree of modulation of the amplitude modulation carrier; in case of an ideal limiter the degree of modulation would even be made to zero.

For a frequency modulated carrier the relations are more complicated, because it is usually desired to determine the transmission characteristics for a large number of sidebands, whereby upon opening the control element for the input signal in the network its amplitude is the primary determining factor for the transmission thereof, while the frequency spectrum determines the influence which the network exerts upon the sidebands.

One has to distinguish further between limiters with or without feedback action; for example, limiters having two biased diodes connected in parallel but with cathode to anode connection. Such a limiter exterts a certain feedback action upon the filter means of the input circuit (resonant circuits, sound filters, etc.). One type of non-feedback limiter is, for example, a multi-grid electron tube having a flat characteristic for larger control grid voltages but still low control grid current. For these two types of limiters the distortion exerted on a modulated carrier is quite different.

It is an object of the invention to provide for a new apparatus and method to measure the transmission or passing characteristics of a four terminal network having non-linear circuit elements, which characteristics are valid for modulated input signals and which employ the method of continuously varying the frequency of the input testing signal.

According to one aspect of the invention in a preferred embodiment thereof, the transmission characteristics, including the amplitude and phase-frequency response, are determined by feeding a phase modulated oscillating signal voltage to the two input terminals of the four terminal network. The modulation frequency is varied but has a small modulation index—preferably smaller than .2. Then the amplitude and/or phase of the sidebands of the output of the network are compared with the corresponding input voltages. Preferably, these sidebands, derived from input and output terminals of the network, are mixed with a signal frequency, which differs from the modulation signal frequency by a constant value, then the comparison can be made with only a constant component of the sidebands to be compared.

The invention and further objects thereof will be understood best from the following description taken in connection with the accompanying drawings illustrating some examples of the invention. In the drawings.

Figure 1:
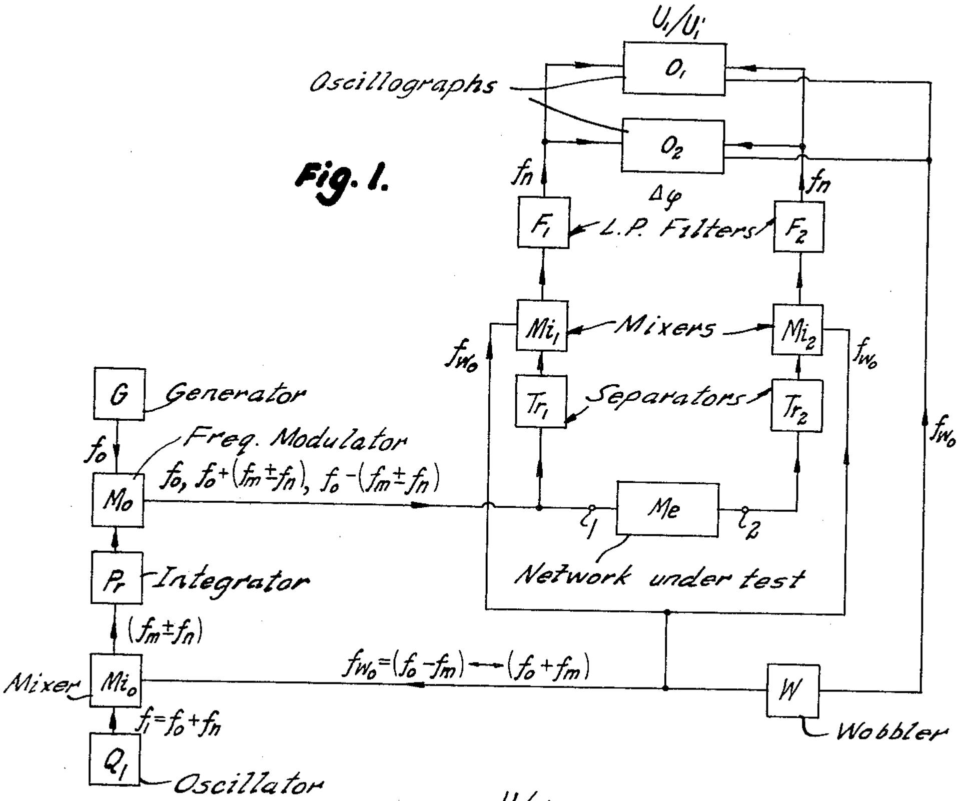
FIGURE 1 is a circuit block diagram of an apparatus using the method in accordance with the invention.

In FIGURE 1, M*o* represents a frequency modulator as known per se, i.e., a signal voltage (carrier) supplied by a suitable generator G having the frequency $fo$ which is frequency modulated with a modulation frequency. The modulation index is sufficiently small, for example .2, that actually only the upper and the lower sidebands of the modulation frequency are present. Thus, the output of M*o* includes only signals having carrier frequency $fo$ and upper and lower side bands $fm$ and $fn$.

The sidebands are the frequencies to be measured in accordance with the method of the invention, while the carrier wave provides for the correct position of the operation point of the limiters or other non-linear circuit elements of the four terminal network to be tested.

Phase modulation results from the arrangement of an integrator P*r* between the modulator input of frequency modulator M*o* and the modulating signal source. With such an arrangement the modulator output voltage decreases proportional to the increase of the modulation frequency, whereby the ratio $\Delta f$ over modulation frequency remains constant and below .2. The frequency increment $\Delta f$ is proportional to the modulating voltage Um.

Putting aside, for the moment, the remaining elements shown in FIGURE 1, the simplest embodiment of the invention, the measuring is carried out as follows: the modulation frequency is varied manually and then the sidebands are monitored by a receiver as to amplitude and, eventually, as to phase, at the input and output terminals 1 and 2 of the four terminal network M*e*. For reasons of clarity only, the connection lines are shown as unipolar lines, but it is understood that every connection line is to be in fact a bipolar line. Thus, even though network M*e* is shown to have only one input terminal and one output terminal, it is understood that these are two pairs of terminals.

Little variations of the sidebands monitored at the input of network M*e* may have a disturbing influence. To eliminate such disturbances it is desirable to compare the sideband voltages of the input and output of network M*e* in a differential or a ratio detecting network. If $U_1$ and $U_2$ are the voltages of a sideband at input and output terminals 1 and 2, respectively, of the network M*e*, then the ratio $U_1/U_2$ corresponds to the amplitude transmission characteristics of the four terminal network. The phase characteristic is determined by comparing the phases ($\varphi_1$ and $\varphi_2$) of the two voltages $U_1$ and $U_2$, respectively, and the plot of $\Delta\varphi=\varphi_1-\varphi_2$ over frequency represents the desired characteristics. It is possible to derive the video transmission characteristic after modulation and the so-called differential phase from the two measurements, and then a relation as to the group travelling time response and of dynamic distortions can be found.

In order to employ the wobble method, it is simply necessary that the comparing device, or more particularly, the indicating element therein, is varied in synchronism with the monitored sideband frequencies. FIGURE 1 illustrates this as follows: A wobbler W produces an oscillating voltage of constant amplitude but with a varying frequency $fw_0$ having a maximum variation range of 50 mcs. This frequency $fw_0$ is to vary from $fo-fm$ to $fo+fm$. The signal having the frequency $fw_0$ is first fed from wobbler W to an electronic mixed $Mi_0$ and a signal having a frequency $f1=fo+fn$ is superimposed therein upon the wobbler output signal having a frequency $fw_0=fo\pm fm$. The auxiliary frequency $f1$ is produced by a quartz oscillator $Q_1$. The frequency $fn$ is the measuring frequency as it will become apparent below.

The output of mixer $Mi_0$ includes signals having a frequency $f1-fw_0$ (or $fw_0-f1$, whichever is larger). The sum of the mixer input frequencies will be suppressed.

This differential frequency is fed to the modulator M*o*. The arrangement of frequency modulator M*o* with prestage integrator P*r* can be substituted by a phase modulator. The modulator produces frequencies *fo* and an upper and a lower sideband thereto. All these frequencies are fed to the four terminal network M*e* to be tested. Input terminals 1 of network M*e* are also connected to a mixer stage $Mi_1$ via a separating circuit $Tr_1$. Output terminals 2 of network M*e* are connected to another mixer stage $Mi_2$ via a separating circuit $Tr_2$. Mixer stages $Mi_1$ and $Mi_2$ are further supplied with signals from wobbler W having the frequency $fw_0$.

The outputs of mixers $Mi_1$ and $Mi_2$ are fed to low pass filters $F_1$ and $F_2$, respectively, cutting off all signals containing frequencies higher than *fn*. The outputs of the filters contain only signals of frequency *fn*. In case the wobble frequency $fw_0$ is higher than *fo*, a component of the upper sideband, and in case the wobble frequencies $fw_0$ is lower than *fo*, a component of the lower sideband, is permitted to pass filters $F_1$ and $F_2$. This will be explained more fully below.

The two voltages appearing at the output sides of filters $F_1$ and $F_2$ and having the same frequency *fn* are compared in oscillographs $O_1$ and $O_2$ as to amplitude and phase, respectively. These voltages of constant frequency *fn* thus monitored and compared with each other have the same characteristics as the entire side band voltages which vary with frequency *fm*. The oscillographs are also supplied with a voltage of frequency $fw_0$ for the horizontal deflection. Oscillograph $O_1$ further includes a quotient indicator measuring the ratio of its two input voltages of frequency *fn*. This ratio determines the vertical deflection in oscillograph $O_1$. Oscillograph $O_2$ includes a phase indicator and the phase difference between the two voltages of frequency *fn* is fed to the vertical deflection device in oscillograph $O_2$.

Briefly, the operation of the measuring arrangement of FIGURE 1 is as follows:

Wobbler W may at a given moment produce a signal of frequency $fw_o=fo-fm$ whereby *fm* is a frequency varying from a given maximum to zero. Thus frequency $fw_o$ is smaller than carrier frequency *fo*. Mixer $Mi_o$ receives this signal and a signal of constant frequency $fo+fn$. The output of mixer $Mi_o$ is a signal having a frequency $fo+fn-(fo-fm)$.

Thus, the modulating signal input of modulator M*o* has a frequency $fm+fn$ and its output comprises the three frequencies $fo$, $fo+(fm+fn)$—upper sideband, and $fo-(fm+fn)$—lower sideband.

These outputs are fed through the network M*e* to be tested. Separators $Tr_1$ and $Tr_2$ monitor the signals at the input and output of network M*e* and then permit only passage of signals having the frequency $fo-(fm+fn)$ and $fo+(fm+fn)$; the carrier *fo* is suppressed. In mixer stages $Mi_1$ and $Mi_2$ these signals representing upper and lower sidebands of network M*e* input and output, respectively, are mixed with the frequency $fwo=fo-fm$ and the following outputs may be produced having the following frequencies:

$$(fo-fm)+[fo+(fm+fn)]=2fo+fn$$
$$(fo-fm)-[fo+(fm+fn)]=-fn \text{ (excluded)}$$
$$(fo-fm)+[fo-(fm+fn)]=2fo-2fm-fn$$
$$(fo-fm)-[fo-(fm+fn)]=+fn$$

The filters $F_1$ and $F_2$ permit only passage of the last one of these frequencies, which in fact was obtained due to the combination of the lower sideband as produced by modulator M*o*, and the wobble frequency $fwo=fo-fm$. Thus, in case of a wobble frequency which is in fact below carrier frequency *fo*, the arrangement measures the passage characteristics of the network M*e* with respect to the lower sideband of the signals fed thereto; from all signals applied to and passing through network M*e* the arrangement $Tr_2$, $Mi_2$ respectively, only pick up the lower sideband, and due to the combining of signals, the indicative output of filters $F_1$ and $F_2$ is of constant frequency *fn* even though the frequency of the lower sideband, $fo-(fm+fn)$, as picked up at the input and output of network M*e* may vary in frequency due to the variations of frequency component *fm* in wobbler W. The outputs of filters $F_1$ and $F_2$ in particular deliver the constant measuring frequency *fn* to the comparing instruments $O_1$ and $O_2$. In case wobbler frequency $fm=fo+fm$, then the signal leaving mixer $Mi_0$ has a frequency $$fo+fm-(fo+fn)=fm-fn$$

Modulator M*o* now produces signals having frequencies $fo$, $fo+(fm-fn)$, $fo-(fm-fn)$. Separators $Tr_1$ and $Tr_2$ remove the carrier signals and in mixer $Mi_1$ and $Mi_2$ the following signals may be produced:

$$(fo+fm)+[fo(fm-fn)]=2fo-fn+2fm$$
$$(fo+fm)-[fo+(fm-fn)]=fn$$
$$(fo+fm)+[fo-(fm-fn)]=2fo+fn$$
$$(fo+fm)-[fo-(fm-fn)]=-fn \text{ (excluded)}$$

The filters $F_1$ and $F_2$ now permit only the passage of the second one of these signals which in fact is the mixing product of the wobbling frequency with the upper sideband of the signals fed from modulator M*o* to the tested network M*e*. Thus, if one changes the wobbler frequency *fwo* from a frequency below the carrier frequency to a frequnecy above thereof, the signal permitted to enter into the comparing stage ($O_1$ and $O_2$) is shifted from the lower sideband to the upper sideband. In other words, in altering the wobble frequency from higher to lower values as compared with the carrier or vice versa, one monitors alternately the transmission characteristics of upper and lower sidebands at variable sideband frequencies, while the measuring frequency is a constant component of these sideband frequencies.

A numerical example will facilitate the understanding of the operation of the arrangement as disclosed thus far.

Suppose carrier frequency $fo=70$ megacycles, modulation frequency for the wobbler $fm=5$ megacycles and testing or measuring frequency $fn=0.1$ megacycles. Then the wobbler W produces for example 75 megacycles and the quartz oscillator $Q_1$ produces 70.1 megacycles. In mixer $Mi_0$ an output frequency of $75-70.1=4.9$ megacycles is produced. The phase modulation now produces the frequencies 65.1 (lower sideband), 70 (carrier) and 74.9 (upper sideband) megacycles. The last one of these frequencies is the upper sideband and when combined, i.e. mixed, with the wobbler frequency of 75 megacycles, the constant measuring frequency of .1 megacycle is produced, i.e. reappears at the output terminal of filters $F_1$ and $F_2$. In case wobbler produces $70-5=65$ mega- the mixer $Mi_0$ produces 5.1 megacycles and phase modulator $Mo$ produces the frequencies 64.9, 70 and 75.1 megacycles. Only the signal of the first one (lower sideband) of these frequencies when combined with the wobbler frequency of 65 megacycles is permitted to pass filters $F_1$ and $F_2$, having also a frequency of 0.1 megacycle.

The method as described above can be carried out with any frequency and can also be used in a measuring device as suggested by Bertie Haard: Some Design Problems in FM Broadband Microwave Systems, Alta Frequenza, Vol. XXVII No. 3–4, pages 245–255 and 262, Giugno Agosto 1958.

One only needs to replace the phase modulator (or frequency modulator with integrator) by an amplitude modulator.

Figure 2:
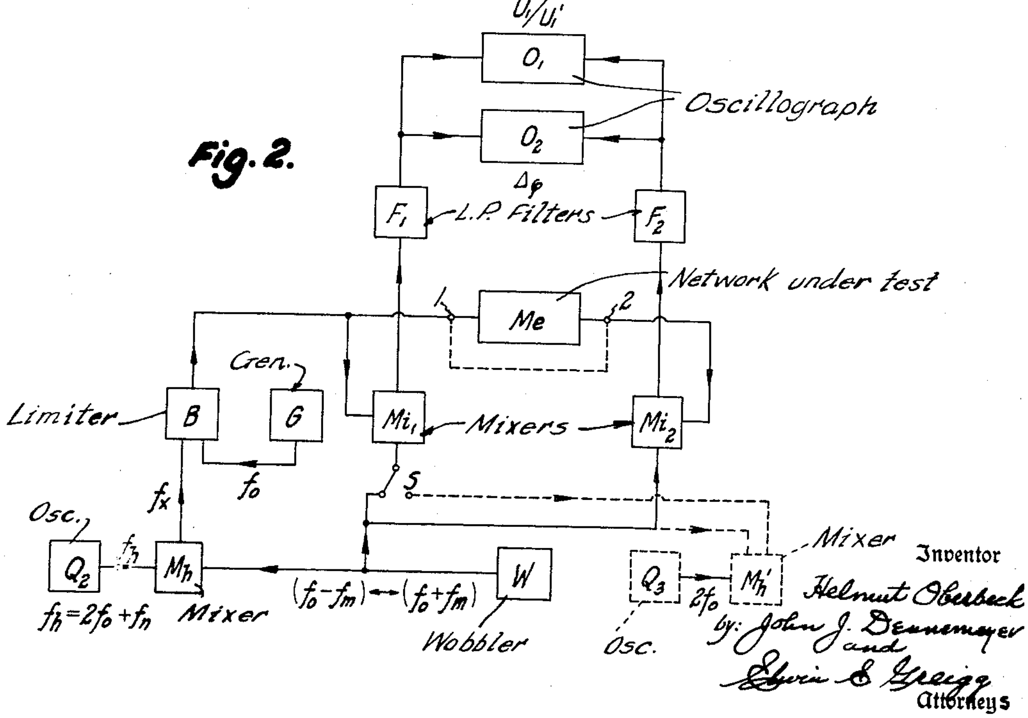
FIGURE 2 is a modification of the arrangement shown in FIGURE 1.

In general, it is difficult in practice to design a correctly operating phase modulator; even the utilization of a frequency modulator with integrator also has some disadvantages. Its center frequency cannot be kept constant exactly because it can only be as correct as its trimmer discriminator having two resonant circuits. In addition, the time response of the adjustment drive is comparatively low and this drive, for example a servomotor, is even capable of producing frequency jumps, or a certain constant error may still remain. If one feeds a carrier frequency $fo$ and a given sideband frequency $fo+\Delta f$ to the same input of an almost ideal limiter, then the combination of the two signals could be considered as a carrier $fo$ which is phase and amplitude modulated with a frequency $fo+\Delta f-fo=\Delta f$. The amplitude modulation will be removed by the limiter and at its output one obtains a phase modulated oscillation. In a further embodiment of the invention it will be described that one can mix the wobble frequencies $fo\pm fm$ with an auxialary frequency $$fh=2fo+fn$$

to produce the incremental frequencies $fo+(fn-fm)$ and $fo+(fn+fm)$, with $fo$ being the carrier frequency, $fm$ being a variable modulation frequency and $fn$ being a given relatively low frequency, the measuring frequency. The frequency obtained in mixing the wobble frequency and the auxiliary frequency is fed to an almost ideal limiter together with the carrier frequency $fo$. The limiter permits passage of signals having the frequencies of its input signals, but another signal is additionally produced having a frequency displaced with respect to the carrier frequency representing a phase modulated oscillation of carrier $fo$ with frequencies $fn+fm$ or $fn-fm$, dependent upon the sign of $fm$. FIGURE 2 shows this in detail.

W is again a wobbler producing frequencies $fo-fm$ and $fo+fm$ within a given range. $fo$ is invariable and equals the carrier frequency, but $fm$ is variable. The output of wobbler W is first fed to a mixer stage $Mh$ receiving also signals from a quartz oscillator $Q_2$ with an auxiliary frequency $fh=2fo+fn$. $fn$ is preferably a low frequency of for example .1 megacycle. Mixer stage $Mh$ produces a frequency $$fx=2fo+fn-(fo\pm fm)=fo+fn\pm fm$$

A generator G produces the carrier frequency $fo$, and signals of both frequencies $fx$ and $fo$ are fed to a limiter B. At the output terminals of limiter B the following signals appear having frequencies: $fx=fo+fn\pm fm$, $fo$ and $fo-(fx-fo)$. Thus at these output terminals one will have signals of an additional frequency $$fo-(fo+fn+fm-fo)=fo-fn-fm$$

or $$fo-(fo+fn-fm-fo)=fo-fn+fm$$

in addition to input frequencies $fo$ and $(fo+fn+fm)$ or $(fo+fn-fm)$.

If one now considers the frequency $fo$ as a carrier and a frequency $fx=fo+\Delta f$ with $\Delta f=(fn\pm fm)$, as an upper sideband fed to the limiter, then one produces with this arrangement a still further new frequency which was not present originally. $\Delta f$ here is the distance between the upper sideband and the carrier frequency and equals $fn+fm$ as stated. Thus, this circuit arrangement described thus far produces a frequency which is displaced by an increment $\Delta f'$ with respect to the carrier $fo$, and it is positioned below thereto in the frequency scale. Thus, one has a kind of lower sideband $(fo+\Delta f')$ which lower sideband ($\Delta f'$ being negative) is not symmetrical to the upper sideband, because $\Delta f'$ differs from $\Delta f$. In more specific terms, $\Delta f=(fm+fn)$ and $\Delta f'=-fm+fn$. The newly produced frequency, $fo+\Delta f'=fo-fm+fn$, will then be used to monitor the four terminal network to be tested. $\Delta f$ and $\Delta f'$ are always substantially smaller than $fo$.

As mentioned above, one can consider the frequency $fo+(fo+\Delta f)$ as a carrier $fo$ being amplitude and phase modulated with $\Delta f$; and due to the limiter action, the output signal of the limiter includes a frequency being only phase modulated. This output frequency of limiter B is fed to a mixer $Mi_1$, to which also the wobbler frequency $fw_0$ is fed. Another mixer $Mi_2$ is supplied also with the wobbler frequency and with signals as they appear at the output terminals of network $Me$. The wobbler frequency is also supplied to mixer $Mi_2$. Mixers $Mi_1$ and $Mi_2$ again produce signals of frequency $fn$ and only those frequencies are permitted to pass filters $F_1$ and $F_2$. The measuring now proceeds as explained in connection with FIGURE 1.

Oscillographs $O_1$ and $O_2$ determine the ratio $U_1/U_2$ and the phase $\Delta\varphi=\varphi_1-\varphi_2$, respectively, of the two signals $U_1$ and $U_2$ derived from filters $F_1$ and $F_2$, $\varphi$ being arbitrary phase positions of the signals U.

With a change of the device as shown in FIGURE 2 one can easily determine the transmission characteristics of limiter B itself or of another limiter to be tested. Another auxiliary mixer stage $Mh'$ is used which is driven by another quartz oscillator $Q_3$ producing a frequency $2fo$. Mixer $Mh'$ mixes the signals coming from wobbler W and from quartz oscillator $Q_3$. By means of a switch S, mixer $Mi_1$ is separated from wobbler W but connected to the output terminals of mixer $Mh'$. Simultaneously network $Me$ is short circuited. Now the oscillographs $O_1$ and $O_2$ will measure the transmission characteristic of limiter B. The dashed lines in FIGURE 2 indicate the connection lines necessary for this supplementary arrangement.

Figure 3:
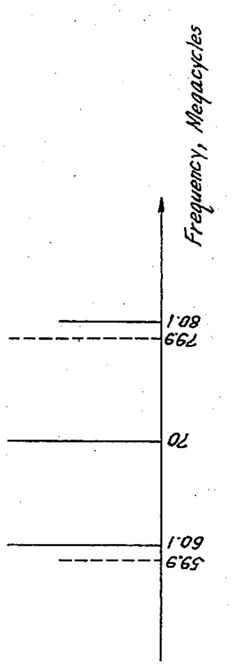
FIGURE 3 is a plot of the frequency spectrum as produced by one element in the device shown in FIGURE 2.

FIGURE 3 is a frequency spectrum for a numerical example of the mode of operation of the arrangement shown in FIGURE 2. The carrier frequency $fo=70$ megacycles, the modulating frequency for the wobbler, $fm=10$ megacycles and the measuring frequency $fn=0.1$ megacycle. The limiter now is supplied with voltages of 70 and 80.1 megacycles, and new frequency of 60.1 megacycles is produced by limiter B. If one feeds to limiter B carrier frequency $fo=70$ megacycles and for example 59.9 megacycles, a new frequency of 79.9 megacycles is produced. This can be shown in an analogous manner for other frequencies.

Figure 4:
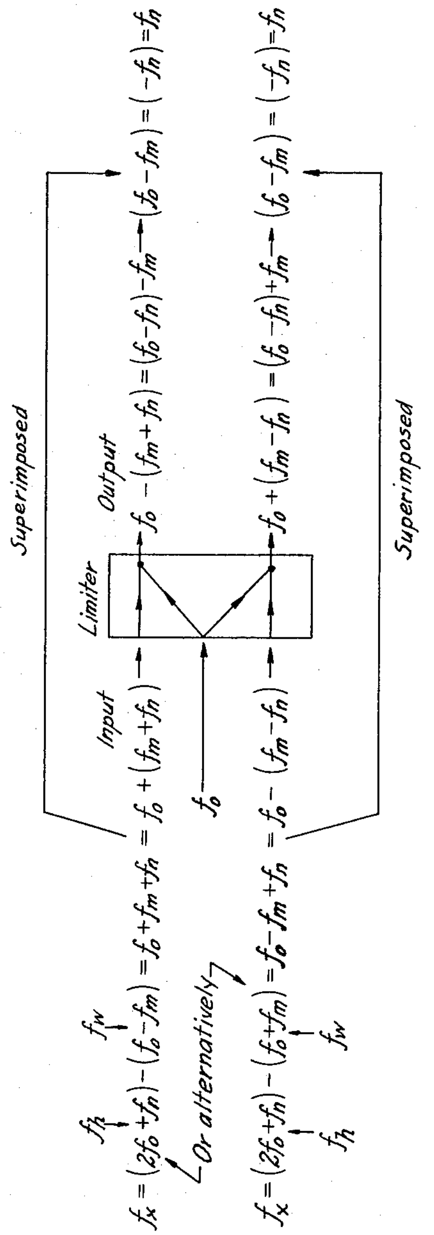
FIGURE 4 is a schematic illsutration of the production of various frequencies in the device shown in FIGURE 2.

FIGURE 4 indicates the production of the various frequencies in the course of the measurement.

The above mentioned circuit arrangements are examples only of how to carry out the invention and are not intended to limit the scope thereof.

I claim:

1. A method for measuring the transmission characteristics of a four terminal network comprising the steps of producing a first signal voltage of variable frequency, producing a second signal voltage of constant frequency, modulating said second signal voltage with said first signal voltage, feeding said modulated signal to the two input terminals of the four terminal network, deriving an output from the two output terminals of said network, and selectively comparing upper and lower sideband signals at the two input and the two output terminals of said network; said comparing step including the steps of, deriving a third signal from the input terminals of said network, mixing said third signal with a component of said first signal to produce a fourth signal of constant frequency, deriving a fifth signal from the output terminals of said network, mixing said fourth signal with said component of said first signal to produce a sixth signal of constant frequency and comparing said fifth and said sixth signal as to at least one characteristic, amplitude and phase.

2. Apparatus for measuring the transmission characteristics of a four terminal network having two input terminals and two output terminals comprising, means for producing a carrier frequency, means for producing an auxiliary constant frequency slightly larger than said carrier frequency, means for producing a variable frequency, the range of variation including said carrier frequency, first mixer means to mix said auxiliary frequency with said variable frequency, modulator means for phase modulating said carrier with the output of said mixing means, means to feed the output of said modulator means to the said input terminals of said network, means for deriving an output from the two output terminals of said network, second and third mixing means fed by said variable frequency and the upper and lower sideband signals from said input and output terminals, respectively, of said network, means for deriving separate output signals from said second and third mixers, having frequencies which equal the sum and difference of said auxiliary and said carrier frequency, and means to compare characteristics of said last mentioned signals.

3. Apparatus as set forth in claim 2, said means for producing a variable frequency including means to periodically vary said frequency.

4. Apparatus as set forth in claim 2, said second and third mixing means including means to suppress said carrier.

5. Apparatus as set forth in claim 2, wherein said means for deriving signals from said second and third mixers comprises low pass filters.

6. Apparatus for measuring the transmission characteristics of a four terminal network having input and output terminals comprising means for producing a carrier frequency, means for producing an auxiliary frequency slightly larger than twice the magnitude of said carrier frequency, means for producing a variable frequency within a range including said carrier frequency, first mixer means to mix said variable frequency and said auxiliary frequency, a limiter supplied with the output of said mixer means and said carrier frequency producing a phase modulated oscillation of said carrier, a second and a third mixer, means to feed said oscillation to said second mixer and said network, said network being connected with its output terminals to said third mixer, means for feeding said variable frequency to said second and third mixer, means for deriving oscillations of constant frequencies from said second and third mixers, and means for comparing characteristics of the said last mentioned oscillations.

7. Apparatus as set forth in claim 6, wherein said last mentioned constant frequency equals the difference of said auxiliary frequency and twice the carrier frequency.

References Cited by the Examiner

UNITED STATES PATENTS

| | | | |
|---|---|---|---|
| 2,530,596 | 11/1950 | Blok | 324—57 |
| 2,596,288 | 5/1952 | Robertson | 324—84 X |
| 2,622,127 | 12/1952 | Alsberg et al. | 324—57 |
| 2,632,792 | 3/1953 | Selz | 324—85 X |
| 2,813,250 | 11/1957 | Tyson | 324—84 X |
| 2,945,177 | 7/1960 | Moren | 324—57 |

FOREIGN PATENTS

| | | |
|---|---|---|
| 701,423 | 1/1941 | Germany. |
| 628,615 | 9/1949 | Great Britain. |
| 678,533 | 9/1952 | Great Britain. |

WALTER L. CARLSON, *Primary Examiner.*

SAMUEL BERNSTEIN, *Examiner.*